March 17, 1964

J. M. MACY 3,125,211

MOTOR MOUNT

Filed Jan. 17, 1962

INVENTOR.
JOHN M. MACY
BY Hobbs & Caxton
ATTORNEYS

March 17, 1964     J. M. MACY     3,125,211
MOTOR MOUNT

Filed Jan. 17, 1962     5 Sheets-Sheet 2

INVENTOR.
JOHN M. MACY
BY Hobbs & Easton
ATTORNEYS

March 17, 1964

J. M. MACY 3,125,211

MOTOR MOUNT

Filed Jan. 17, 1962

INVENTOR.
JOHN M. MACY
BY Hobbs & Caston
ATTORNEYS

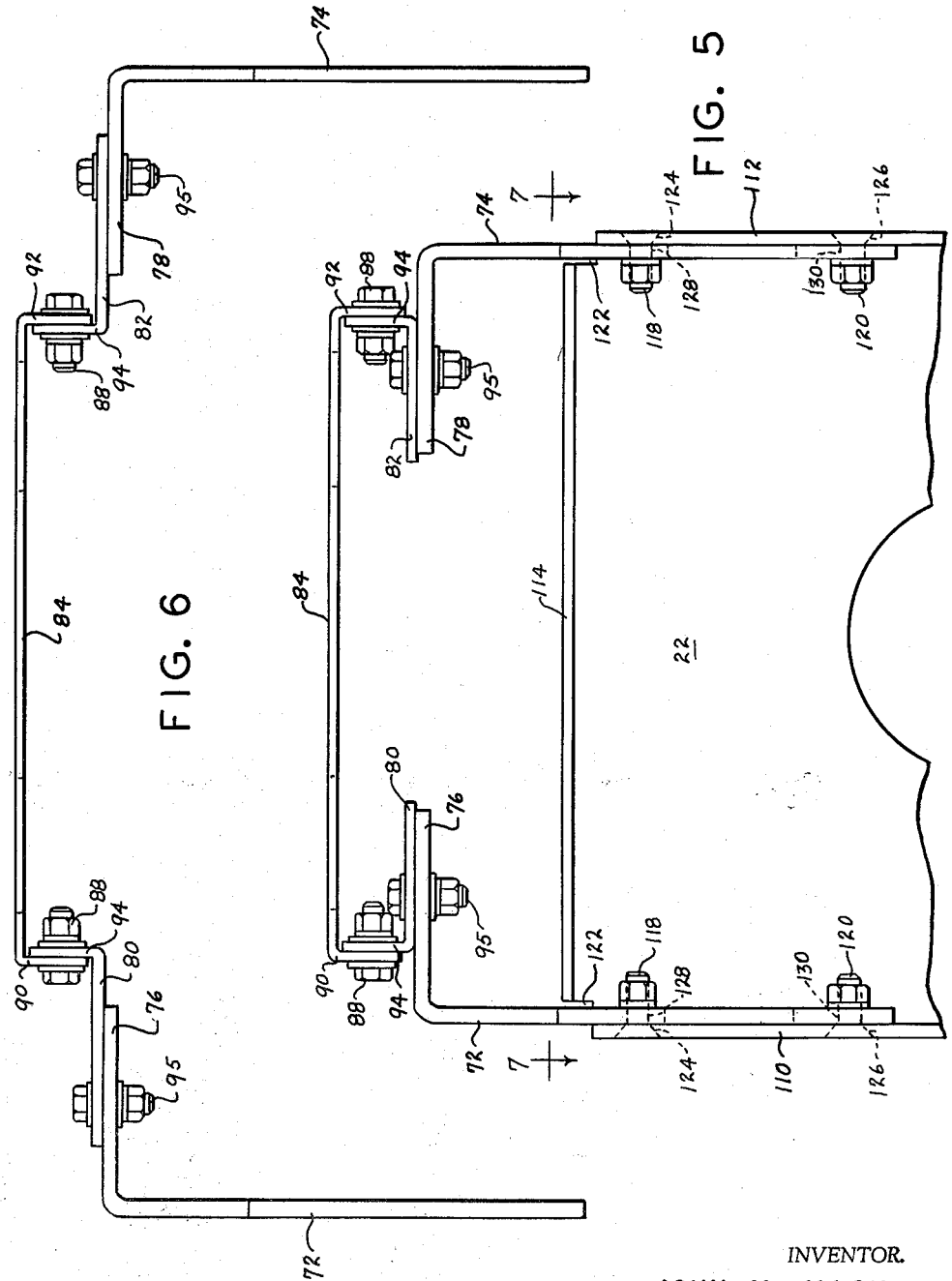

March 17, 1964  J. M. MACY  3,125,211
MOTOR MOUNT

Filed Jan. 17, 1962  5 Sheets-Sheet 5

INVENTOR.
JOHN M. MACY
BY Hobbs & Caston
ATTORNEYS

United States Patent Office
3,125,211
Patented Mar. 17, 1964

3,125,211
MOTOR MOUNT
John M. Macy, South Bend, Ind., assignor to Dodge Manufacturing Corporation, Mishawaka, Ind., a corporation of Indiana
Filed Jan. 17, 1962, Ser. No. 166,789
9 Claims. (Cl. 198—213)

The present invention relates to a motor mount and more particularly to a motor mount assembly for use in conjunction with drive mechanisms for machinery, such as, for example, screw conveyors in which the motor is mounted on and supported by the machinery structure.

The drive of a conventional or standard screw conveyor usually consists of a speed reducer mounted on the end of the conveyor and connected directly to the center shaft of the screw and driven through V-belts by an electrical motor, frequently mounted directly on the conveyor structure or on the reducer housing. In the installation in which the motor is mounted on the conveyor structure, the mounting base for the motor has in most instances in the past been secured to the upper side of the trough extending longitudinally thereon and projecting beyond the end. Since most conveyors of this type are provided with a removable cover, the foregoing type of mounting base interferes with the removal of the cover, often requiring the disassembly and removal of the motor base before the cover can be removed from the conveyor trough. This involves a substantial amount of labor and down time and an occasional readjustment of the drive after the mounting base has been reassembled in place on the conveyor. In an effort to relocate the motor mounting base so that it will not interfere with the conveyor cover, structures for supporting the base have been mounted directly on the reducer housing; but these have generally been found unsatisfactory in that the housing structure to which the base can be effectively secured is limited and often too small to give the support to the base required for the necessary rigidity, stability and durability, together with satisfactory performance of the motor drive. It is therefore one of the principal objects of the present invention to provide a motor mount assembly for use in connection with screw conveyors, which can be mounted directly and rigidly on the conveyor structure without interfering with the removal of the cover or access to other parts for servicing the conveyor mechanism, and which can readily and easily be placed in various angular positions with respect to the conveyor shaft and thereafter effectively adjusted to provide the correct tension on the belt drive between the motor and input shaft.

Another object of the invention is to provide a motor mount base for screw conveyors and similar equipment, which is mounted on and secured directly to the end plate of the conveyor in spaced relation to the conveyor trough and cover, and which is so constructed and arranged that deflection, pivoting and vibration from the dynamic forces transmitted from the motor to the reducer are eliminated or minimized as a factor in the operation of the drive.

A further object of the invention is to provide a rigid, integrated motor mount and drive assembly for screw conveyors and similar equipment, the motor and reducer of which can be adjusted and positioned relative to one another to meet installation requirements and provide optimum performance of the drive under all operating conditions.

Still another object is to provide a relatively simple, rugged and versatile motor mount which can easily be fabricated using standard materials and equipment and which can readily be assembled at the place of installation and thereafter adjusted without the use of any special tools or equipment.

Another object of the invention is to provide a motor mounting assembly for screw conveyors and similar equipment, the parts and fixtures of which can be used in connection with a large variety of conveyor and motor sizes and different makes and types of equipment.

Additional objects and advantages of the invention will become apparent from the following description and accompanying drawings, wherein:

FIGURE 5 is a front elevational view of the motor mount shown in FIGURE 4;

FIGURE 6 is a front elevational view of the motor mount shown in the preceding figure, adjusted to a large size screw conveyor;

Figure 1:
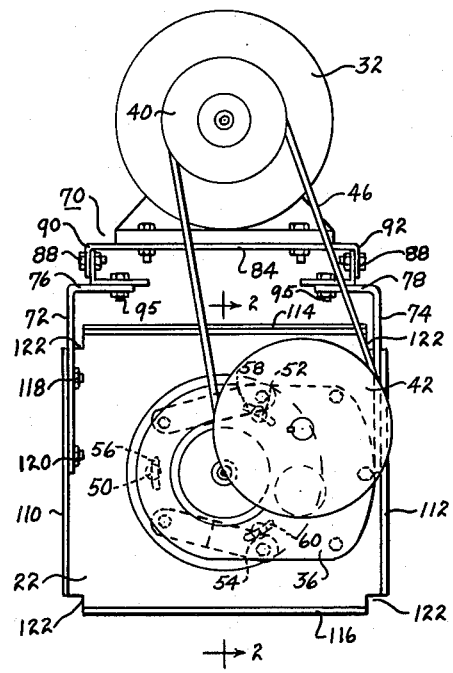
FIGURE 1 is a front elevational view of the present motor mount assembly, showing the assembly secured to the end of a screw conveyor.
Figure 2:
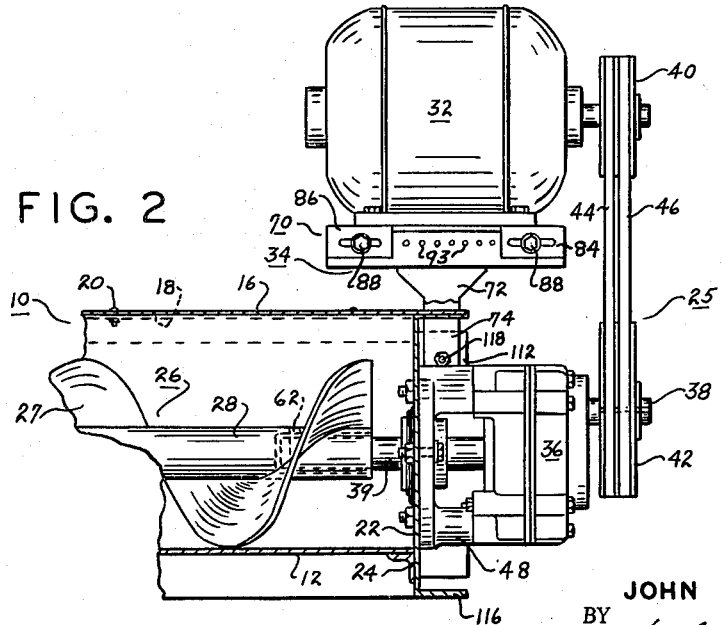
FIGURE 2 is a partial vertical cross sectional and side elevational view of the motor mount assembly and screw conveyor shown in FIGURE 1, the section being taken on line 2—2 of the latter figure.
Figure 3:
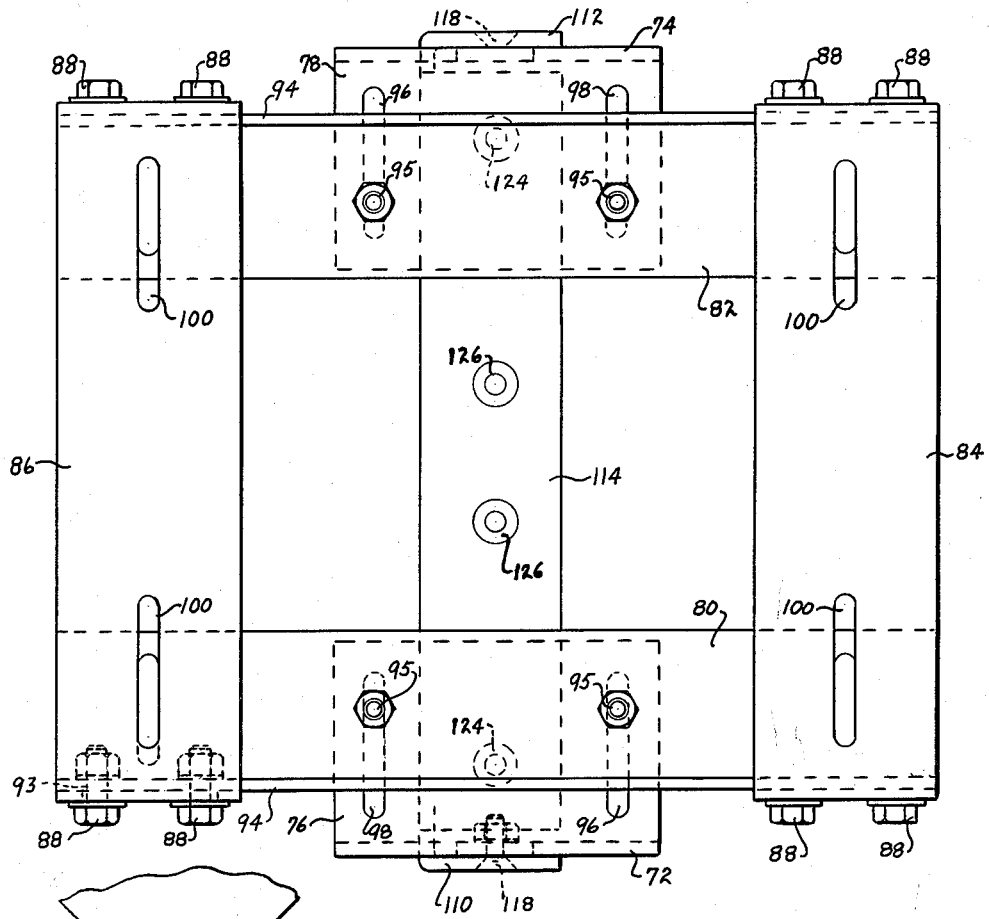
FIGURE 3 is a top plan view of the motor base forming a part of the present motor mount assembly, showing said base with the motor removed.
Figures 7, 8:
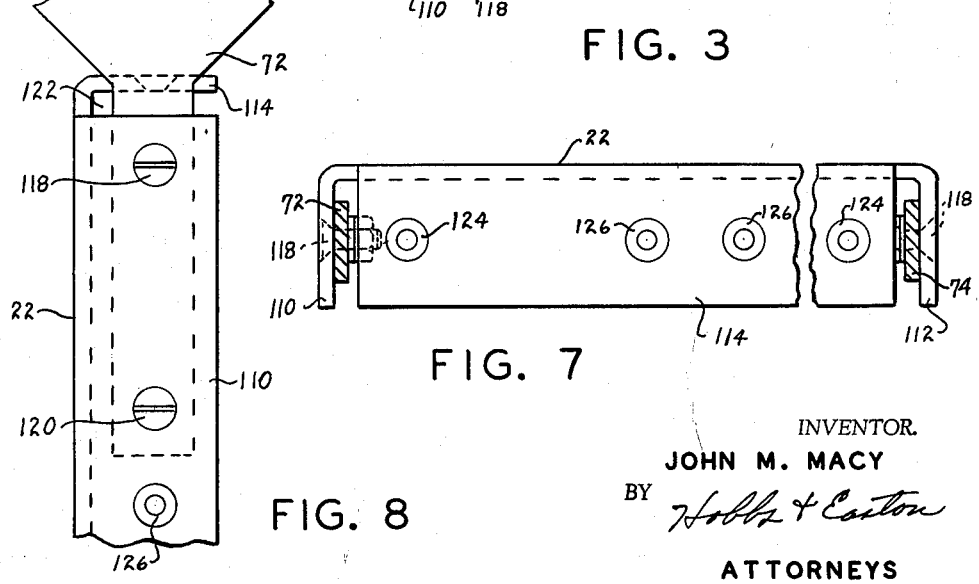
FIGURE 7 is a fragmentary, cross sectional view of the present motor mount assembly, the section being taken on line 7—7 of FIGURE 5.
FIGURE 8 is a fragmentary side elevational view of the motor mount assembly showing the manner in which the mount is secured to the conveyor end plate.

Referring more specifically to the drawings, particularly to FIGURES 1 and 2, numeral 10 designates a screw conveyor having a trough 12 mounted on a suitable base (not shown) and closed by a removable cover 16 secured to externally extending flanges 18 on the upper edges of trough 12 by a plurality of spaced bolts 20 extending through the cover and flanges. The trough is closed at the end shown by an end plate 22 rigidly secured to the trough by an angle iron member 24 and suitable rivets or bolts (not shown) and supporting a power drive mechanism 25 for rotating screw 26, the screw consisting of a spiral blade 27 joined to a hollow center shaft 28 rotated by the drive mechanism 25. The conveyor, including the trough, end plate and screw thus far described, are conventional in construction and operation, and hence will not be described in greater detail herein, and are shown for the purpose of illustrating one embodiment of the present invention.

The drive mechanism 25 consists of a motor 32 mounted on the present motor mount, designated generally by numeral 34, and a speed reducer 36 having an input shaft 38 and an output shaft 39, the reducer being driven by motor 32 through sheaves 40 and 42 on the motor and reducer, respectively, and V-belts 44 and 46. The motor and reducer may be considered, for the purpose of the present description, as conventional equipment, the motor being readily available on the market, and the reducer preferably being of the general type shown in U.S. Patent No. 2,925,740, owned by common assignee. The reducer is mounted on an adapter 48, which in turn is secured to plate 22 by three bolts 50, 52 and 54, extending through slots 56, 58 and 60, respectively, in the base of the adapter, the slots permitting the reducer to be rotated slightly to increase or decrease the tension on belts 44 and 46 by moving sheave 42 further or closer to sheave 40 on the motor. Output shaft 39 extends through the adapter into the end of hollow shaft 28 for rotating the screw and is secured in said shaft by a bolt or pin 62 or by any other suitable securing means.

The motor mount 34, as shown in FIGURES 1 and 2, consists of a motor base 70 supported by two legs 72 and 74, each leg having laterally extending portions 76 and 78, respectively, for supporting longitudinal members 80 and 82 of base 70. Two cross members 84 and 86 on which motor 32 is mounted directly are secured at their ends to longitudinal members 80 and 82 by bolts 88 extending through slots 89 in downward extensions 90 and 92 on opposite ends of cross members 84 and 86 and through holes 93 in upturned edges 94 on longitudinal members 80 and 82. The longitudinal members are joined to legs 72 and 74 by bolts 95, extending downwardly through members 80 and 82 and through slots 96 and 98 in laterally extending portions 76 and 78 on the two legs. The two slots permit the motor base 70 to be shifted laterally and the two legs closer together and farther apart to adapt the motor mount to various sized conveyor end panels. Cross members 84 and 86 may be placed at various positions along longitudinal members 80 and 82 in order to adapt the base to various sized motors, and to position sheave 40 in proper alignment with sheave 42 on the reducer 36, the motor being secured to cross members 84 and 86 by bolts extending through holes in the base of the motor and through slots 100 in the cross members.

Legs 72 and 74 are supported rigidly on end panel 22 by securing them to side flanges 110 and 112 or top and bottom flanges 114 and 116, respectively, by bolts 118 and 120 extending through legs 72 and 74 to opposite flanges. The four flanges extend parallel with the respective edge of end plate 22 and terminate inwardly from the corners in order to provide slots 122 through which the two legs extend inwardly along the internal side of the flanges. All four flanges contain a pair of holes 124 and 126 at each end for receiving bolts 118 and 120, respectively, which extend through holes 128 and 130 and clamp legs 72 and 74 rigidly to the flanges. The hole arrangement in the flanges permits the legs to be secured to either end of the side flanges or to either end of the top and bottom flanges, thus permitting the motor to be mounted at the top or bottom or on either side.

Figure 9:
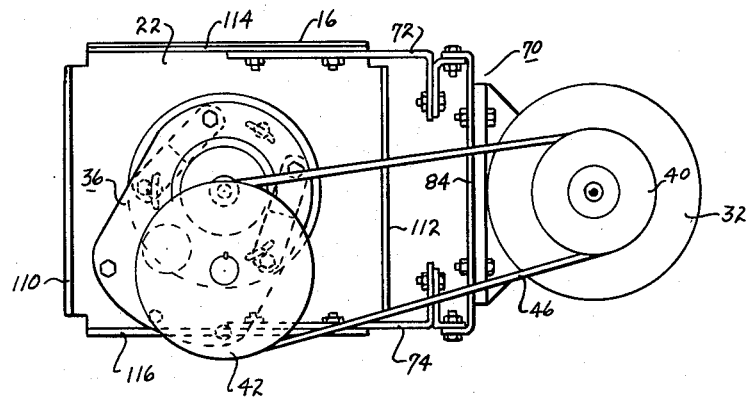
FIGURE 9 is a front elevational view of the present motor mount assembly, showing the motor and gear reducer thereof mounted in different positions from those shown in FIGURE 1.
Figure 4:
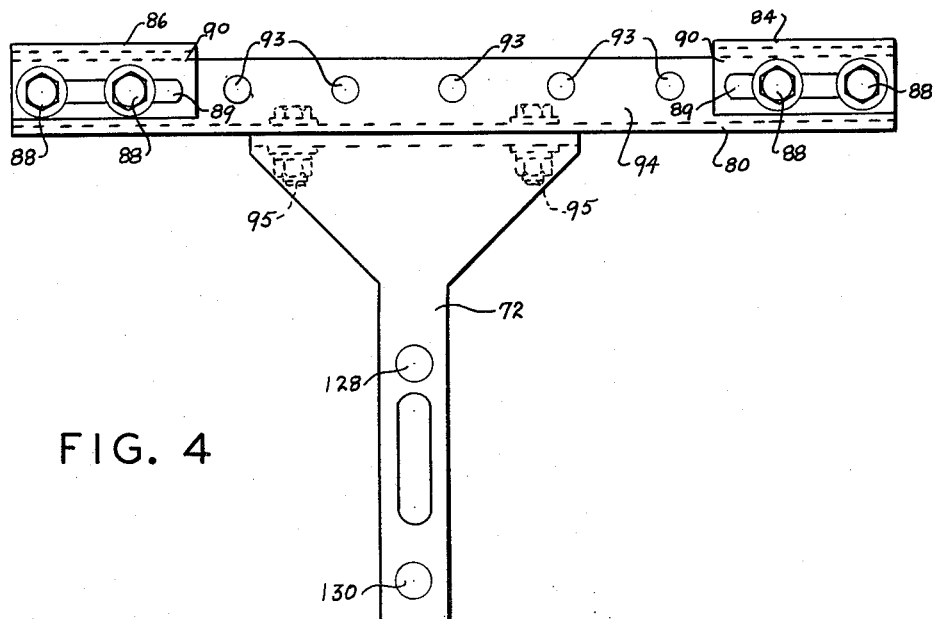
FIGURE 4 is a side elevational view of the present motor mount showing it with the motor removed and with it removed from the end of the screw conveyor.

In the embodiment shown in FIGURES 1 and 2, the motor is mounted above the conveyor, and the legs extend downwardly along the internal side of flanges 110 and 112, and are rigidly bolted thereto by bolts 118 and 120. In the embodiment shown in FIGURE 9, the motor is mounted to the side of the conveyor, and legs 72 and 74 extend laterally from base 70 along the internal side of upper and lower flanges 114 and 116, and are bolted rigidly thereto by bolts 118 and 120. In order to obtain the desired belt length, reducer 36 in the latter embodiment has been rotated one hundred twenty degrees, placing sheave 42 at the bottom of plate 22. The rotation of the reducer is obtained by removing bolts 50, 52 and 54 from the respective slots, and rotating the reducer one-third of a revolution and replacing the bolts in the slots, the reducer being further rotated in either direction in order to obtain the desired tension on belts 44 and 46 after the repositioning of the motor base and reducer has been made.

Figure 10:
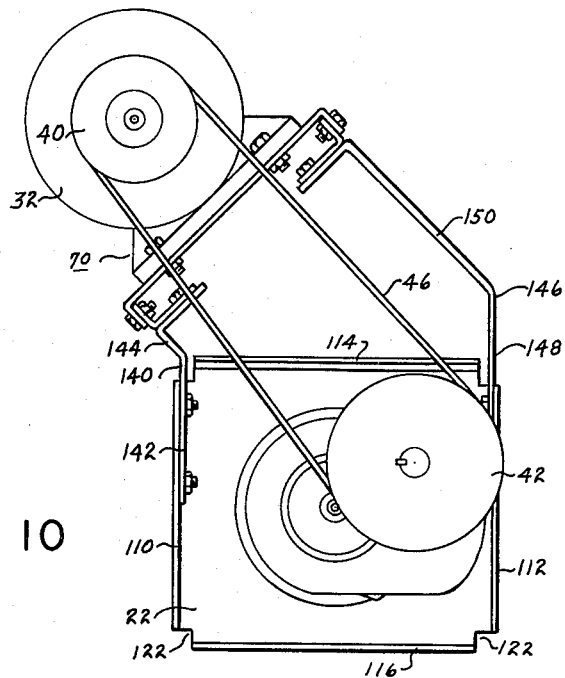
FIGURES 10 and 11 are front elevational views of modified forms of the present invention showing the motor placed at various angular positions with respect to the reducer.
Figure 11:
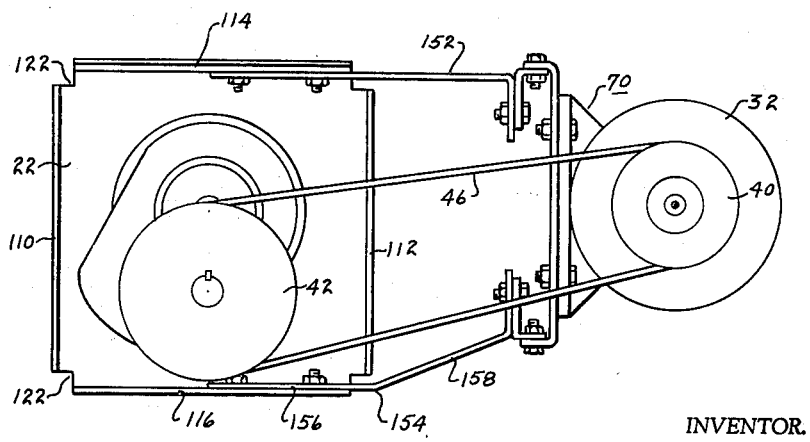

Further modified forms of the present invention are illustrated in FIGURES 10 and 11, wherein front elevational views of the motor mount assemblies are shown with the motor and gear reducers thereof mounted in different positions. Since the conveyor end plate, its flanges and the motor base are identical to those shown in the preceding figures, like numerals will be used on like parts. In FIGURE 10, motor 32 is offset laterally and mounted on base 70 at a forty-five degree angle, the base being supported by a relatively short leg 140 having a portion 142 paralleling flange 110 and a portion 144 extending laterally at a forty-five degree angle, and by a leg 146 having a portion 148 paralleling flange 112 and a portion 150 extending laterally inwardly at a forty-five degree angle. In FIGURE 11 the motor is shown mounted at the side of plate 22 and supported on legs 152 and 154, leg 152 being straight and parallel to flange 114, and leg 154 having a portion 156 paralleling flange 116 and an angular portion 158 extending upwardly. The angularity of these legs may be varied from one installation to another in order to place motor 22 in any desired angular and/or offset position with respect to the reducer 36.

One of the advantages of the present motor mount assembly is its versatility with respect to various sizes of conveyor end plates. This is illustrated by FIGURES 5 and 6 wherein longitudinal members have been repositioned with edges 94 on the inner side in FIGURE 6, rather than on the outer side as shown in FIGURE 5. Cross members 84 and 86 are secured to the longitudinal members in this expanded position. Slots 96 and 98 in laterally extending portions 76 and 78 of legs 72 and 74 permit the legs to be adjusted inwardly and outwardly to adapt them to the width of the particular end plate, i.e. the spacing between flanges 110 and 112 for the position shown in FIGURE 1, or the spacing between flanges 114 and 116 for the position shown in FIGURE 9.

The present motor mounting assembly, including base 70 and legs 72 and 74, and end plate 22 with the oppositely disposed supporting side flanges 110 and 112 and top and bottom flanges 114 and 116, provides a particularly sturdy motor support structure which retains the motor in a sufficiently rigid and stable position to eliminate the effect of the dynamic forces of the belt on the motor and thereby prevent pivoting, bending and appreciable vibration on the motor mount assembly. While several modified forms of the present motor mount have been described in detail herein, various changes and further modifications may be made without departing from the scope of the invention.

I claim:

1. In combination, a screw conveyor end plate with spaced parallel flanges, and a motor mount comprising leg members secured to said flanges and projecting beyond the edge of said plate, an angular-shaped elongated member secured to each of said legs in laterally spaced parallel relation to one another, and two spaced cross members secured at their ends to said elongated members for receiving and supporting a motor.

2. In combination, a vertically positioned plate having laterally spaced parallel flanges, and a motor mount comprising leg members secured to said flanges and projecting beyond the edge of said plate, an elongated member secured to each of said legs in laterally spaced relation to one another, and a cross member secured at each end to the respective elongated member for receiving and supporting a motor.

3. In combination, a screw conveyor end plate with opposed laterally extending flanges, and a motor mount comprising leg members secured to said flanges and projecting beyond the edge of said plate, said legs having portions extending toward one another, an elongated member secured to each of said portions in side-by-side spaced relation, and two spaced cross members having an inwardly extending portion at each end secured to the respective elongated member for receiving and supporting a motor.

4. In combination, a screw conveyor end plate with two laterally extending parallel flanges spaced from the corners of said plate, and a motor mount comprising leg members secured to said flanges and projecting beyond the edge of said plate, said legs having portions extending toward one another with elongated parallel slots therein, an elongated angular-shaped member on each leg, bolts extending through said elongated members and said slots to secure said members to said portions in side-by-side spaced relation, and two spaced cross members having an inwardly extending portion at each end secured to the respective elongated member, said cross members having elongated slots therein for receiving bolts for securing a motor to said cross members.

5. In a motor mount assembly: an end plate with spaced parallel flanges, leg members secured to and arranged parallel with said flanges and projecting beyond the edge of said plate, elongated members secured to each of said legs in laterally spaced parallel relation to one another, and two spaced cross members secured at their ends to said elongated members for receiving and supporting a motor.

6. A motor mount assembly for screw conveyors, comprising a rectangular end plate having laterally extending flanges disposed along each edge, leg members secured to and arranged parallel with opposite flanges on the internal side thereof and projecting beyond the edge of said plate, said legs having portions extending toward one another with elongated slots therein, elongated angular-shaped members secured to each of said portions in laterally spaced parallel relation to one another, bolts extending through said elongated members and said slots to secure said members to said portions, and two spaced cross members having an inwardly extending portion at each end secured to the respective elongated member.

7. A motor mount assembly comprising a rectangular plate with spaced parallel flanges, leg members secured to and arranged parallel with said flanges and projecting beyond the corresponding edge of said plate, longitudinal members secured to each of said legs in laterally spaced parallel relation to one another, and a cross member secured to said longitudinal members for receiving and supporting a motor.

8. In combination, a vertically positioned plate having two sets of diametrically positioned flanges parallel to and spaced from one another, and a motor mount comprising leg members having portions secured to said flanges and projecting beyond the edge of said plate and parallel angular portions extending laterally from said first mentioned portions, an elongated member secured to each of said legs in laterally spaced relation to one another, and a cross member secured at each end to the respective elongated member for receiving and supporting a motor.

9. In combination, a screw conveyor end plate with two sets of diametrically positioned flanges parallel to and spaced from one another, and a motor mount comprising leg members secured to said flanges and projecting beyond the edge of said plate, one of said members having an angular portion extending laterally toward the other of said legs, an elongated member secured to each of said legs in laterally spaced parallel relation to one another, and two spaced cross members secured at their ends to said elongated members for receiving and supporting a motor.

References Cited in the file of this patent
UNITED STATES PATENTS

| 2,098,061 | Munoz et al. | Nov. 2, 1937 |
| 2,167,793 | Barger | Aug. 1, 1939 |
| 2,175,576 | Smith | Oct. 10, 1939 |
| 2,812,054 | Dorris et al. | Nov. 5, 1957 |
| 2,925,740 | Chung | Feb. 23, 1960 |